(12) United States Patent
Holzapfel

(10) Patent No.: US 7,573,581 B2
(45) Date of Patent: Aug. 11, 2009

(54) POSITION-MEASURING DEVICE

(75) Inventor: Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 428 days.

(21) Appl. No.: 11/518,360

(22) Filed: Sep. 7, 2006

(65) Prior Publication Data

US 2007/0058173 A1    Mar. 15, 2007

(30) Foreign Application Priority Data

Sep. 12, 2005    (DE)    ........................ 10 2005 043 569

(51) Int. Cl.
*G01B 9/02* (2006.01)
*G01B 11/02* (2006.01)
*G01D 5/36* (2006.01)

(52) U.S. Cl. .................... 356/499; 356/521; 250/237 G

(58) Field of Classification Search ................. 356/488, 356/494, 499, 521; 250/231.14–231.18, 250/237 G See application file for complete search history.

(56) References Cited

U.S. PATENT DOCUMENTS

| | | | | |
|---|---|---|---|---|
| 4,636,076 A | * | 1/1987 | Pettigrew | .................... 356/499 |
| 4,776,701 A | | 10/1988 | Pettigrew | |
| 5,206,704 A | * | 4/1993 | Huber et al. | ............ 250/237 G |
| 6,351,313 B1 | | 2/2002 | Braasch et al. | |
| 6,922,248 B2 | * | 7/2005 | Steegmuller | ................. 356/499 |

FOREIGN PATENT DOCUMENTS

| | | |
|---|---|---|
| EP | 0 163 362 | 12/1985 |
| EP | 0 448 982 | 10/1991 |
| EP | 1 019 669 | 7/2000 |

* cited by examiner

*Primary Examiner*—Patrick J Connolly
(74) *Attorney, Agent, or Firm*—Kenyon & Kenyon LLP

(57) ABSTRACT

A position-measuring device is for measuring the position of two objects that are movable relative to one another. The device includes a measuring graduation, which is connected to one of the two objects, as well as at least one scanning system for scanning the measuring graduation, which is connected to the other of the two objects. The scanning system is arranged to permit a simultaneous determination of the position values along at least one lateral and along one vertical shift direction of the objects.

35 Claims, 6 Drawing Sheets

$$\xi_1 = -\frac{SP}{2\pi} \cdot [(\vec{k}_{1,out} - \vec{k}_{1,in} + \vec{k}_{2,out} - \vec{k}_{2,in}) - (\vec{k}'_{1,out} - \vec{k}'_{1,in} + \vec{k}'_{2,out} - \vec{k}'_{2,in})] \cdot \Delta\vec{x}_M$$

$$= -\frac{SP}{2\pi} \cdot 2 \cdot (\vec{k}_{1,out} - \vec{k}'_{1,out}) \cdot \Delta\vec{x}_M$$

POSITION-MEASURING DEVICE

CROSS-REFERENCE TO RELATED APPLICATIONS

The present application claims priority to Application No. 10 2005 043 569.6, filed in the Federal Republic of Germany on Sep. 12, 2005, which is expressly incorporated herein in its entirety by reference thereto.

FIELD OF THE INVENTION

The present invention relates to an optical position-measuring device.

BACKGROUND INFORMATION

In semiconductor manufacturing devices, it is necessary to precisely determine the spatial position of certain parts, which are movable relative to each other, using suitable position-measuring devices. A computer-controlled sequencing control in these devices is then possible based on the position information. Thus, for example, in wafer steppers, the position of mask and wafer must be measured very precisely in all 6 degrees of freedom (6DOF). In conventional methods, this position measuring is mainly performed using several laser interferometers. In the future, it can be expected that the stringent accuracy requirements of the position measuring, accompanied at the same time by increasing traversing speeds of the various parts, will further increase. While, currently, for example, accuracy requirements of a few nm at speeds of approximately 1 m/s may be specified, in the future, subnanometer accuracies at markedly higher speeds can be expected. However, given such high accuracy requirements, it is believed that laser interferometers are not usable as position-measuring devices, since refractive-index fluctuations in the ambient air, even when working with optimal air showers, lead to measured-value fluctuations in the position measuring of several nm.

For this reason, alternative position-measuring devices have already been proposed in equipment of this type. Thus, it is described, for example, in European Published Patent Application No. 1 019 669 to use optical position-measuring devices having so-called cross gratings as a two-dimensional measuring graduation. Systems of this type are minimally influenced by possible fluctuations in the refractive index of the air, and therefore allow position measurements which may be reproduced well.

From the cross-grating scanning, the lateral degrees of freedom X, Y, Rz can be recorded in such systems (X: translation along the X-axis; Y: translation along the Y-axis; Rz: rotation about the Z-axis). Therefore, in order to record all six possible degrees of freedom, and also the additional degrees of freedom Z, Rx, Ry (Z: translation along the Z-axis; Rx: rotation about the x-axis; Ry: rotation about the y-axis) using measuring techniques, a further position measurement is required in the z-direction. For this purpose, European Published Patent Application No. 1 019 669 describes additional distance sensors, e.g., capacitive or contacting probes. However, such distance sensors are believed to be insufficient, given the precision required.

Alternatively, in principle, interferometers may also be used as distance sensors supplying the necessary precision. However, they require significant extra expenditure with regard to housing, signal processing, signal correction, etc. For example, in this case, it is thus difficult to mount air showers which have a laminar flow parallel or perpendicular to the cross grating. However, air showers of this type may be indispensable for sufficient interferometer measuring accuracy at this location. In addition, it is problematic to accomplish the exact time synchronization of the position-measurement values from the cross-grating scanning and from the interferometric distance measuring.

Furthermore, in conventional grating-based position-measuring devices, it is also possible to determine the scanning distance between two gratings in the scanning beam path. In this connection, reference is made, for example, to European Published Patent Application No. 0 448 982.

SUMMARY

Example embodiments of the present invention may provide a position-measuring device which makes it possible to simultaneously measure at least one lateral and one vertical degree of freedom of two objects, movable relative to each other, at a measurement location in common, with high accuracy and with as low an expenditure as possible.

A position-measuring device for measuring the position of two objects that are movable relative to each other includes a measuring graduation that is connected to one of the two objects, as well as at least one scanning system for scanning the measuring graduation, which is connected to the other of the two objects. The scanning system is arranged such that it permits a simultaneous determination of the position value along at least one lateral, and along one vertical shift direction of the objects.

On the part of the scanning system, e.g., a first and a second scanning beam path are formed for determining position in the lateral and vertical shift direction. In it, a group of phase-shifted signals is able to be generated on the output side from, in each case, two interfering partial beams of rays.

The two partial beams of rays of each scanning beam path may be arranged asymmetrically with respect to a plane perpendicular to the lateral shift direction. Moreover, the second beam path is arranged in mirror symmetry with respect to the first beam path relative to a plane perpendicular to the lateral shift direction, and the two partial beams of rays of each scanning beam path are diffracted in different orders of diffraction at the measuring graduation.

The two partial beams of rays of each scanning beam path may be diffracted in the +1st or −1st order of diffraction at the measuring graduation.

An evaluation device may be provided to determine primary position values from interpolated, phase-shifted signals of both groups, a lateral and a vertical position value being ascertainable from the primary position values.

Furthermore, a compensation device may be provided to compensate for possible interpolation errors of those position values from which a lateral and a vertical position value are ascertainable.

An optical device may be arranged in the respective scanning beam paths to, in each case, provide identical optical path lengths for the interfering partial beams of rays.

The measuring graduation may include one two-dimensional cross grating and three scanning systems which are disposed in non-collinear manner relative to each other, in order to measure the movement of both objects in all six spatial degrees of freedom from the linked position values of the three scanning systems.

The position-measuring device may be particularly suitable for determining the position of components of a semiconductor manufacturing device.

According to an example embodiment of the present invention, a position-measuring device for measuring a position of two objects movable relative to one another includes: a measuring graduation connected to one of the two objects; and at least one scanning system adapted to scan the measuring graduation and connected to the other of the two objects, the scanning system adapted to permit a simultaneous determination of position values along at least one lateral shift direction of the objects and along a vertical shift direction of the objects.

The scanning system may be adapted to form a first scanning beam path and a second scanning beam path to determine the position in the lateral shift direction and the vertical shift direction, and the scanning system may be adapted to generate a group of phase-shifted signals from two interfering partial beams of rays in each of the scanning beam paths.

The two partial beams of rays of each scanning beam path may be arranged asymmetrically with respect to a plane perpendicular to the lateral shift direction, the second scanning beam path may be arranged in mirror symmetry with respect to the first scanning beam path relative to the plane perpendicular to the lateral shift direction, and the two partial beams of rays of each scanning beam path may be diffracted in different orders of diffraction at the measuring graduation.

The position-measuring device may include an evaluation device adapted to determine primary position values from interpolated, phase-shifted signals of both groups, and a lateral position value and a vertical position value may be ascertainable from the primary position values.

The position-measuring device may include a compensation device adapted to compensate for possible interpolation errors of the primary position values.

The position-measuring device may include an optical device arranged in at least one of the scanning beam paths adapted to provide identical optical path lengths for the interfering partial beams of rays.

The two partial beams of rays of each scanning beam path may be diffracted in one of (a) +1st and (b) −1st order of diffraction at the measuring graduation.

The measuring graduation may include a two-dimensional cross grating, and the at least one scanning system may include three scanning systems arranged in a non-collinear configuration relative to each other, which may be adapted to determine the movement of the objects in six spatial degrees of freedom from linked position values of the three scanning systems.

The two objects may be components of a semiconductor manufacturing device.

Further features and aspects of example embodiments of the present invention are described in more detail below with reference to the appended Figures.

DETAILED DESCRIPTION

Before underlying principles of example embodiments of the present invention are discussed in further detail below, first a mathematical description of interferential position-measuring devices having measuring graduations in the form of gratings are explained. This is also used in the following to further describe example embodiments of the present invention.

In grating-based, interferential position-measuring devices, usually one beam of rays of a light source is split into two (or more) partial beams of rays. The partial beams of rays are shifted differently in their phase by diffraction at a material-measure grating, and ultimately brought to interference again. In this context, to the greatest extent possible, the traversed optical path lengths of both partial beams of rays should be of equal length. In this manner, the position values are made independent of the wavelength of the light source. Therefore, the beam paths of high-resolution position-measuring devices are usually selected to be symmetrical with respect to a plane (YZ) perpendicular to the measuring direction (X). The grating-based, interferential position-measuring devices thereby also become independent with respect to changes in distance (Z) between the scanning system and the measuring graduation, which, in general, is a desirable characteristic.

To be able to precisely delimit example embodiments of the present invention from the basic principle of conventional grating-based, interferential position-measuring devices, it is necessary to more precisely describe the interaction (grating diffraction, combined with transmission or reflection) of the two partial beams of rays with the grating of the measuring graduation. In response to each interaction, the k-vectors of the partial beams of rays are changed as follows:

$$\Delta \vec{k}_n = \vec{k}_{n,out} - \vec{k}_{n,in} \text{ (first partial beam of rays) or}$$

$$\Delta \vec{k}'_n = \vec{k}'_{n,out} - \vec{k}'_{n,in} \text{ (second partial beam of rays)}$$

Figure 1:
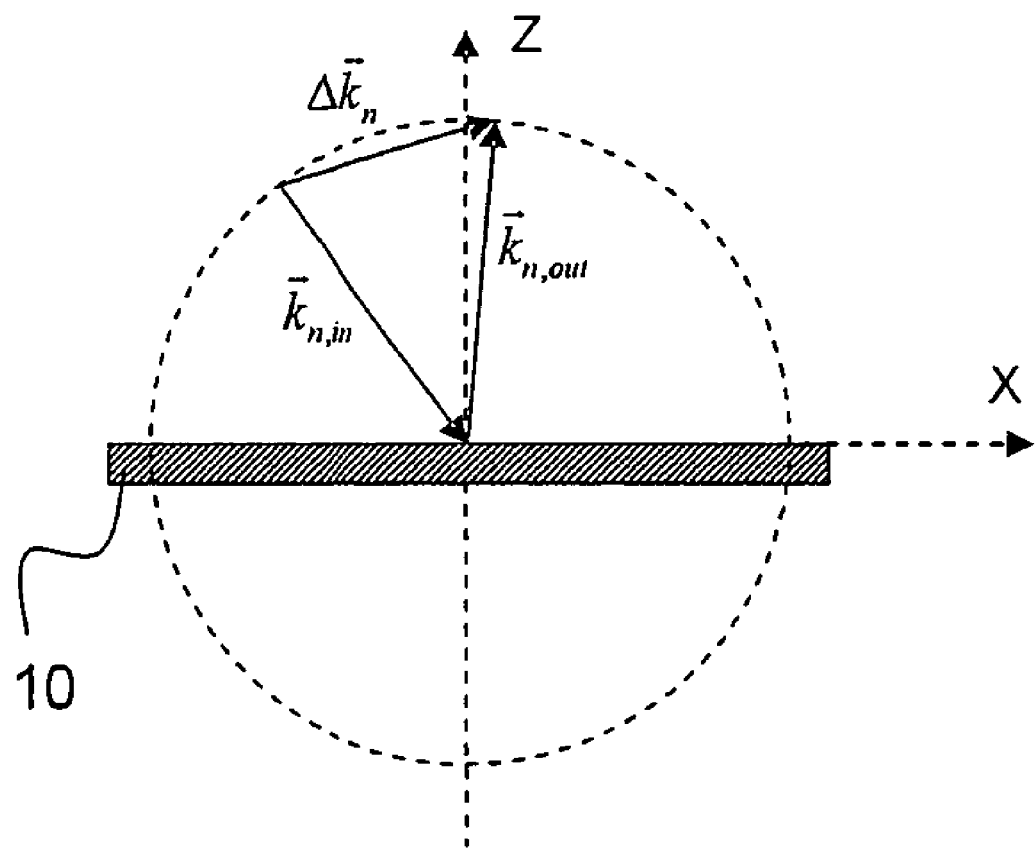
FIG. 1 is a schematic view of a grating-based, interferential position-measuring device.

In this connection, n in each case numbers the interactions of the partial beams of rays with the measuring graduation. As illustrated, for example, in FIG. 1, for the most part, one or two such interactions with measuring graduation 10 usually result. The phase shifts $\Delta \Phi_n$ for the first partial beam of rays, and $\Delta \Phi'_n$ for the second partial beam of rays due to the n-th interaction with measuring graduation 10 are represented by the equations:

$$\Delta \Phi_n = -\Delta \vec{k}_n \cdot \Delta \vec{x}_M \text{ (first partial beam of rays) or}$$

$$\Delta \Phi_n' = -\Delta \vec{k}'_n \cdot \Delta \vec{x}_M \text{ (second partial beam of rays)}$$

where $\Delta \vec{x}_M$ denotes the position shift of measuring graduation 10. The phase shift of the two partial beams of rays at the location of the interference yields the indicated position value $\xi$ of the corresponding position-measuring device, according to the relationship:

$$\xi = \frac{SP}{2\pi} \sum_n (\Delta \Phi_n - \Delta \Phi'_n) = -\frac{SP}{2\pi} \sum_n (\Delta \vec{k}_n - \Delta \vec{k}'_n) \cdot \Delta \vec{x}_M$$

where SP represents the signal period of the position-measuring device and $\Delta \vec{x}_M$ represents the position of the measuring graduation In such a manner, a sensitivity vector $\vec{\alpha}$ may be defined, which describes the linear change of the position value with the shift $\Delta \vec{x}_M$ of the measuring graduation:

$$\xi = \vec{a} \cdot \Delta \vec{x}_M,$$

where $$\vec{a} = -\frac{SP}{2\pi} \sum_n (\Delta \vec{k}_n - \Delta \vec{k}'_n).$$

Due to the mentioned, symmetrical arrangement of conventional high-resolution, grating-based, interferential position-measuring devices, $\Delta \vec{k}'_n$ is always in mirror symmetry (relative to the YZ plane) with respect to $\Delta \vec{k}_n$, and consequently, sensitivity vector $\vec{\alpha}$ is parallel to the plane of measuring graduation 10. This is deliberate, since the intention is to measure only along the material-measure plane. A pure change in distance $\Delta \vec{x}_M = \Delta z \cdot \vec{e}_z$ of measuring graduation 10 relative to the scanning unit does not lead to a change in the position value.

According to example embodiments of the present invention, a position-measuring device is provided having scanning systems which simultaneously measure at least one lateral position (X, Y) and one vertical distance (Z). By linking position values of at least three such scanning systems, which scan the measuring graduation at three different non-collinear locations and which are aligned in at least two different lateral measuring or shift directions (X, Y), it is possible to determine all six degrees of freedom.

Figure 2:
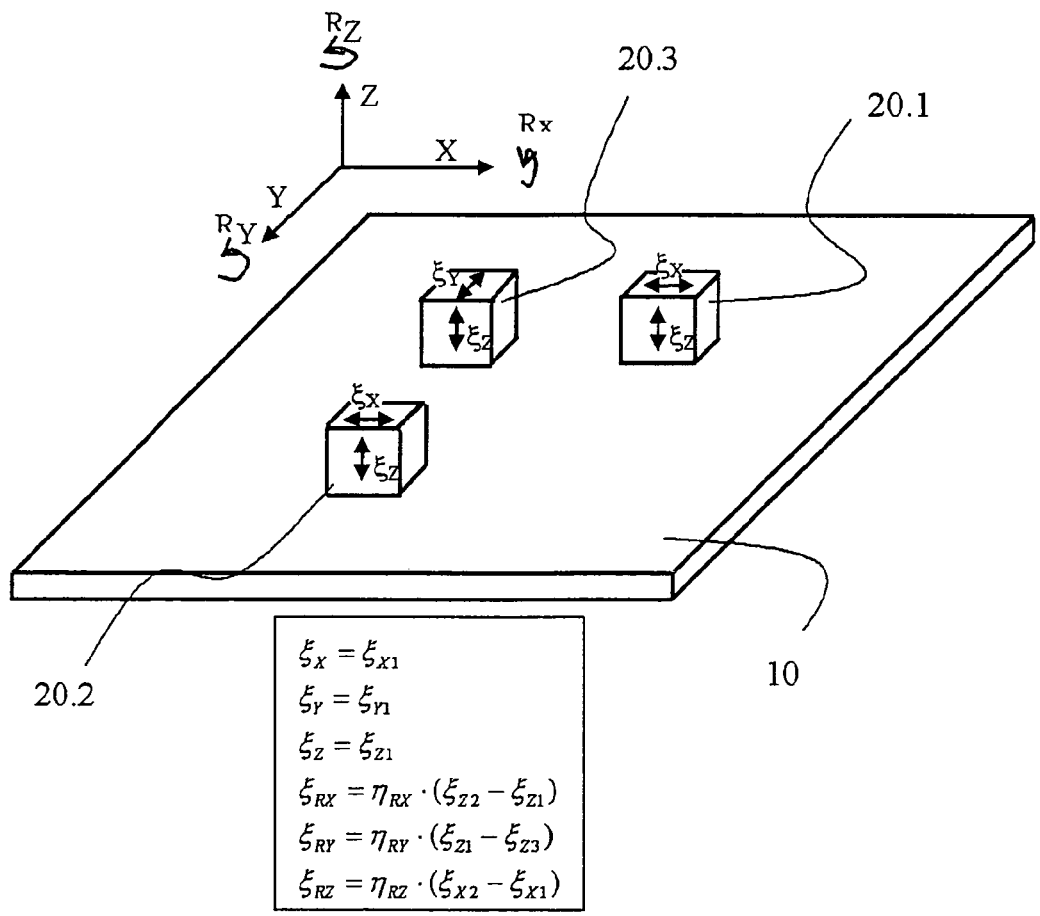
FIG. 2 is a schematic view of a measuring system for acquiring all six degrees of freedom using measuring techniques.

An example of such a layout is illustrated in FIG. 2, including several relevant variables. The output position values $\xi_X$, $\xi_Y$, $\xi_Z$, $\xi_{RX}$, $\xi_{RY}$, $\xi_{RZ}$ (so-called tertiary position values) are calculated from a suitable linear combination of secondary position values $\xi_{X1}$, $\xi_{X2}$, $\xi_{Y1}$, $\xi_{Z1}$, $\xi_{Z2}$, $\xi_{Z3}$ initially supplied by individual scanning systems 20.1, 20.2, 20.3. Each scanning system 20.1, 20.2, 20.3 may determine exactly one lateral ($\xi_x$ or $\xi_y$) and exactly one vertical ($\xi_z$) secondary position value.

According to example embodiments of the present invention, in each individual scanning system 20.1, 20.2, 20.3, two pairs of partial beams of rays are generated, which are diffracted at least once at measuring graduation 10 and then in each instance brought to interference. Hereinafter, it is assumed that the lateral measuring direction is parallel to the X-direction. The mirror symmetry mentioned repeatedly below then relates to the YZ-plane. It should be appreciated that the explanations below may also be transferred analogously to another lateral measuring direction (e.g., Y).

Due to the two pairs of interfering partial beams of rays, two groups of signals are obtained, each group, e.g., in a conventional manner, including a plurality of signals that are out of phase relative to each other.

According to example embodiments of the present invention, the beam trajectory of the two interfering partial beams of rays of the first pair is selected so that it is not mirror-symmetric. In general, this results in a sensitivity vector $\vec{\alpha}_1$ that is no longer parallel to the X-direction, and therefore to the material-measure surface, but rather is at a defined angle α to the material-measure surface in the XZ-plane. The beam trajectory of the second pair of interfering partial beams of rays is selected to be in mirror symmetry with respect to the beam trajectory of the first pair. Correspondingly, sensitivity vector $\vec{\alpha}_2$ of the second pair is then in mirror symmetry to $\vec{\alpha}_1$. From the two groups of phase-shifted signals, position values ξ1, ξ2 may be determined, e.g., in a conventional manner, which are denoted as primary position values. They can be described in first order by the following equations:

$$\xi_1 = \vec{\alpha}_1 \cdot \Delta \vec{x}_M$$

$$\xi_2 = \vec{\alpha}_2 \cdot \Delta \vec{x}_M$$

By addition and subtraction, secondary position values $\xi_{XS}$ and $\xi_{ZS}$ are obtained from them, to which corresponding sensitivity vectors $\vec{\alpha}_{XS}$, $\vec{\alpha}_{ZS}$ may be assigned according to the following equations:

$$\xi_{XS} = \frac{1}{2}(\xi_1 - \xi_2) = \frac{1}{2}(\vec{a}_1 - \vec{a}_2) \cdot \Delta \vec{x}_M = \vec{a}_{XS} \cdot \Delta \vec{x}_M$$

$$\xi_{ZS} = \frac{1}{2}(\xi_1 + \xi_2) = \frac{1}{2}(\vec{a}_1 + \vec{a}_2) \cdot \Delta \vec{x}_M = \vec{a}_{ZS} \cdot \Delta \vec{x}_M$$

Because of the mirror symmetry, sensitivity vector $\vec{\alpha}_{XS}$ is always parallel to the material-measure surface and along first measuring direction X. On the other hand, sensitivity vector $\vec{\alpha}_{ZS}$ is always perpendicular to the material-measure surface, and therefore parallel to the Z-direction. Thus, the individual scanning system 20.1, 20.2, 20.3 supplies exactly one lateral and one vertical position value.

A more precise analysis with the inclusion of material-measure tilts possibly resulting, shows that the (lateral) XY-positions of the effective measuring points are identical for the two secondary position values. Thus, the mirror-symmetric layout provides that both values $\xi_{xs}$ and $\xi_{zs}$ are measured at one central XY-point in common. In this context, the X-position is on the plane of symmetry (YZ-plane) of the position-measuring device. One measuring point in common facilitates the calibration of the position-measuring devices upon startup, since the number of free parameters (like the measuring-point positions of all scannings) turns out to be less.

The wavelength dependency of such a grating-based, interferential position-measuring device is also of interest. By the difference formation $$\xi_{XS} = \frac{1}{2}(\xi_1 - \xi_2)$$

to form the lateral, secondary position value, the phase positions of the four participant partial beams of rays are added or subtracted. In each case, two partial beams of rays have a mirror-symmetric beam trajectory, i.e., their optical path lengths are identical. Upon careful analysis, these phase positions of the mirror-symmetric partial beams of rays are in each case subtracted from each other, so that the phase shifts on the basis of the optical path lengths cancel each other out. Only the phase shifts based on the grating diffractions remain. The resulting phase difference therefore corresponds to the phase difference in a conventional, interferential, grating-based position-measuring device. This means that lateral position value $\xi_{XS}$ is no longer dependent on the wavelength. The difference is in that when using a conventional, grating-based position-measuring device, the two interfering partial beams of rays are already mirror-symmetric, and their phase shifts are directly subtracted from each other by the interference formation, while in example embodiments of the present invention, non-mirror-symmetric partial beams of rays interfere, and the phase shifts of mirror-symmetric partial beams of rays are only brought into difference by the offsetting of two primary position values.

The wavelength independence of lateral position value $\xi_{XS}$ is an important aspect hereof. Since the accuracy requirements of lateral position values $\xi_{XS}$ are generally higher by a factor of 10 than the requirements of vertical position values $\xi_{ZS}$, the wavelength stability of the light source used only has to be oriented to the lower requirements of the vertical measured values. A more careful analysis of the wavelength dependency of vertical position values $\xi_{ZS}$ shows that it is comparable to that of a conventional interferometer for determining position along the Z-axis. It should be taken into account that as a rule, with typically 1 mm, the measurement path in the Z-direction is very much smaller than the measurement path to be covered in the lateral direction (e.g., >400 mm). The optical path lengths of the two interfering partial beams of rays may be compensated at the nominal distance $Z_0$ (see below). Wavelength dependencies of the acquired position values, which, however, remain comparatively small, then only occur in the case of deviating distances $Z=Z_0+\Delta Z$.

It is also possible to compensate easily for interpolation errors possibly resulting. Thus, a pure lateral movement of measuring graduation 10 along the X-direction without a movement in the Z-direction leads to a phase shift of both primary position values $\xi_1$ and $\xi_2$. Therefore, complete periods of the signal errors and/or interpolation errors may be recorded within short measurement paths, which is a prerequisite for a stable error analysis. The interpolation errors of the primary position values may be analyzed and corrected or compensated using conventional adaptive methods. After the correction and offsetting of the two primary position values to form secondary position values, the latter are without interpolation errors. Local interpolation errors (in the X-direction), because of the inclined sensitivity vectors $\vec{\alpha}_1, \vec{\alpha}_2$ may be compensated even when there is no movement in the Z-direction. Lateral measuring directions (X, Y) of individual scanning systems 20.1, 20.2, 20.3 may be aligned at an angle with respect to the main movement directions of the specific machine in which the position-measuring device, and for which movement directions complete accuracy may be required. For example, they may be arranged diagonally (e.g., Rz=45°).

Because of the mirror symmetry, the orders of diffraction of the measuring graduation which are provided for the signal generation are identical for both groups of signals. For example, only the +1st and −1st orders of diffraction may be used. The diffraction efficiencies of these orders of diffraction may be maximized easily in a conventional manner by the suitable selection of the diffraction structure. A simultaneous optimization for further sensors with possibly different scanning principles and/or different wavelength dependencies may therefore be omitted. Such measures may be necessary, for instance, if, as explained at the outset, a cross-grating measuring graduation is used in conjunction with an interferometer-based distance sensor. Thus, in this case, the cross-grating scanning would require high diffraction efficiencies in the +1st and −1st orders of diffraction, while an optimized zeroth order of diffraction would be necessary for the interferometric distance measuring. Since, in this connection, the cross-grating measuring graduation is further used as a reflector for the distance interferometer, in addition a—e.g., costly—suitable layout of the same would be necessary in view of the different wavelengths used in the cross-grating scanning and the interferometric distance determination.

Figure 3:
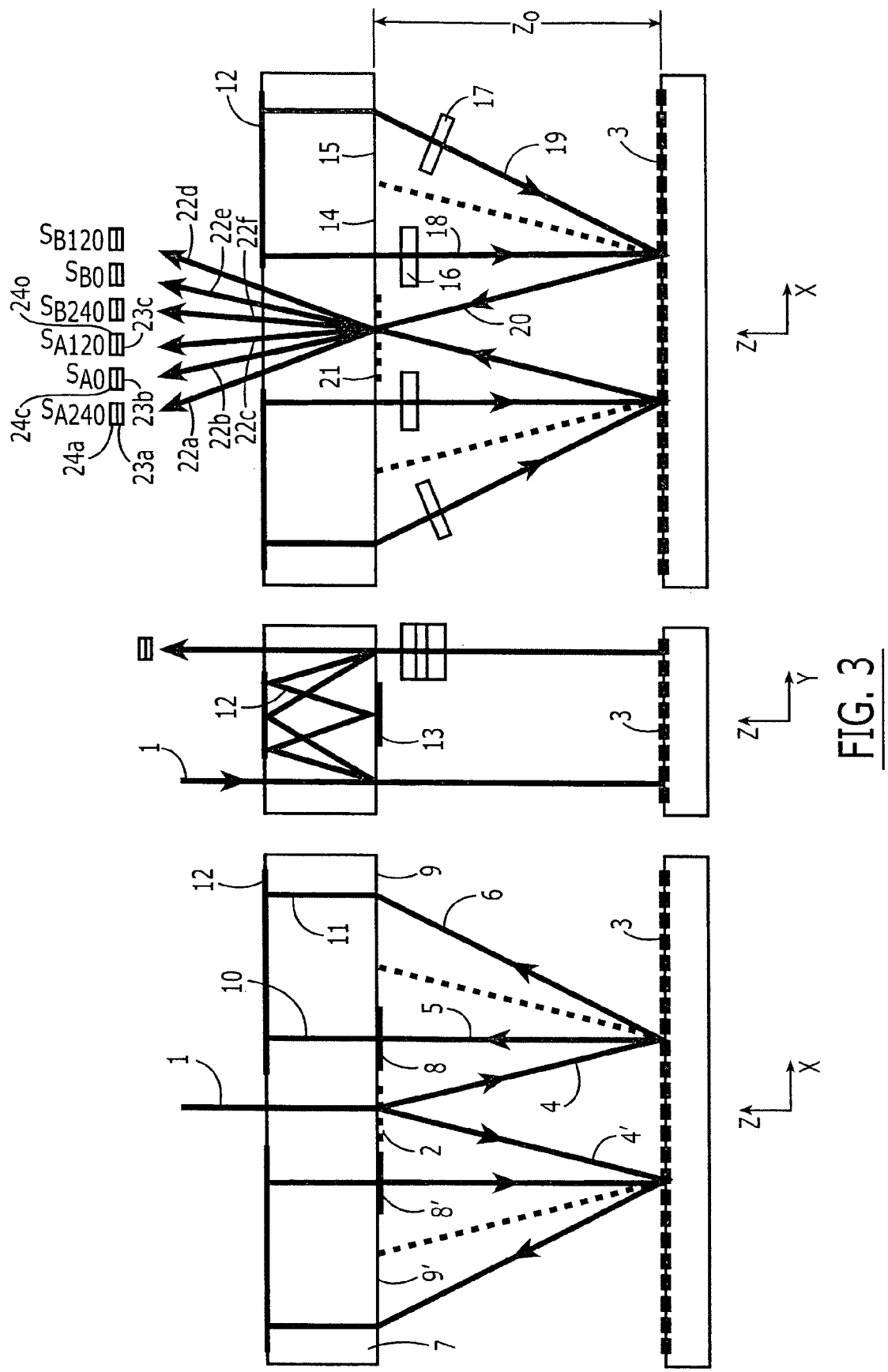
FIG. 3 are various views of the scanning beam path of a position-measuring device according to an example embodiment of the present invention.
Figure 4:
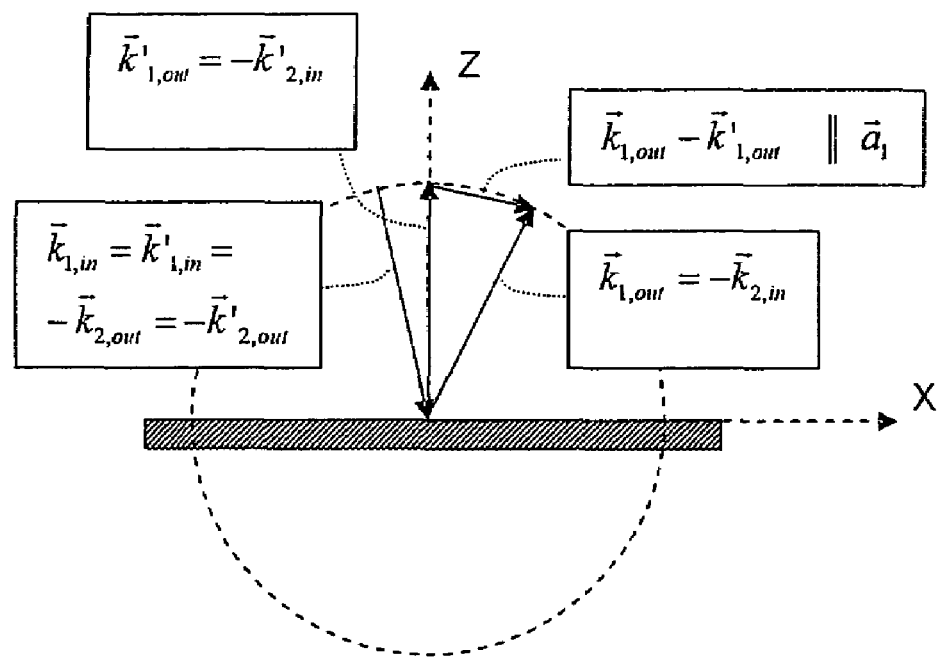
FIG. 4 is a schematic view by which the determination of the sensitivity vector of the example embodiment illustrated in FIG. 3 is clarified.

A position-measuring device according to an example embodiment of the present invention is described below with reference to FIGS. 3 and 4. FIG. 3 illustrates the scanning beam path of this exemplary embodiment in various spatial views.

An incident, linearly polarized beam of rays 1 of a collimated laser beam coming from a light source is split by a splitting grating 2 on the lower side of a scanning plate 7 into a +1st and −1st order of diffraction 4, 4'. The grating constant of splitting grating 2 is identical with that of measuring graduation 3. The beam of rays of +1st order of diffraction 4 of splitting grating 2 arrives at reflection measuring graduation 3 and is split there by diffraction into a +1st and −1st order of diffraction in two partial beams of rays 5, 6. Partial beam of rays 5 diffracted in the −1st order of diffraction arrives parallel to optical axis Z (i.e., in 0th resulting order of diffraction) back in the direction of scanning plate 7. Partial beam of rays 6, deflected in $+1^{st}$ order of diffraction, propagates in the direction of a $2^{nd}$ resulting order of diffraction. Both partial beams of rays 5, 6 reach diffractive deflection structures 8, 9 on the lower side of scanning plate 7. These deflection structures 8, 9 are dimensioned such that they direct emerging partial beams of rays 10, 11 in the XZ-plane in each case parallel to the Z-direction and deflect them laterally in the YZ-plane and focus them corresponding to a cylindrical lens.

Striking partial beam of rays 5 in the 0th resulting order of diffraction is reflected by a mirror 12 on the upper side of scanning plate 7 and then arrives at a mirror 13 on the lower side of scanning plate 7. The focus location of diffractive deflection structure 8 or cylindrical lens mentioned above is also located there. The partial beam of rays is thereupon reflected again by mirror 12 on the upper side of scanning plate 7 and arrives at a second deflection structure 14 on the lower side of scanning plate 7.

Partial beam of rays 6 in the +2nd resulting order of diffraction striking scanning plate 7 reaches mirror 12 on its upper side, where the focus location of traversed deflection grating 9 is also arranged. After the reflection, it arrives directly at a second deflection structure 15 on the lower side of scanning plate 7.

Second deflection structures 14, 15, in each case specific to the XZ-plane, are in mirror symmetry with respect to first deflection structures 8, 9, and therefore direct the incident partial beams of rays in a manner laterally displaced in the Y-direction but in the opposite direction with respect to partial beams of rays 5, 6 originally striking scanning plate 7, back to measuring graduation 3. Before they are diffracted again by measuring graduation 3, they pass through λ/4-plates 16, 17, which are oriented differently for both partial beams of rays 18, 19, so that left-circularly polarized and right-circularly polarized partial beams of rays are obtained. At measuring graduation 3, they are each diffracted with the same order of diffraction as when striking the first time, i.e., in the +1st or −1st order. Due to this diffraction, the two partial beams of rays 18, 19 are directed in parallel as beam of rays 20 back to scanning plate 7.

There, they pass through a splitting grating 21, which splits the united partial beams of rays into 3 single beams 22a, 22b, 22c. These 3 single beams 22a, 22b, 22c pass through differently oriented polarizers 23a, 23b, 23c before they are detected by detectors 24a, 24b, 24c and converted into electrical signals $S_{A0°}$, $S_{A120°}$, $S_{A240°}$. The three polarizers 23*a*, 23*b*, 23*c* are in an angle raster of 60°, so that signals $S_{A0°}$, $S_{A120°}$, $S_{A240°}$ having a phase shift of 120° relative to each other result.

Partial beam of rays 6 in the 2nd resulting order of diffraction striking scanning plate 7 pass through longer optical paths between scanning plate 7 and measuring graduation 3 than partial beam of rays 5 in the 0 resulting order of diffraction. To compensate for these path differences, different beam paths in the YZ-plane are provided within scanning plate 7, e.g., in the form of the above-described threefold reflection of the one partial beam of rays and the one-time reflection of the other partial beam of rays. Given suitable dimensioning of the scanning-plate thickness and of deflection gratings 8, 9, 14, 15, it is possible to eliminate the path-length differences at the nominal distance $Z_0$.

Beam of rays 4', deflected by the first splitting grating in the −1st order of diffraction, in terms of the YZ-plane is split mirror-symmetrically by deflection gratings 8', 9', disposed correspondingly in mirror-symmetric fashion, on scanning plate 7, and united again. This results in signals $S_{B0°}$, $S_{B120°}$, $S_{B240°}$.

A position value is calculated, e.g., in a conventional manner, from each group of phase-shifted signals $S_{A0°}$, $S_{A120°}$, $S_{A240°}$ and $S_{B0°}$, $S_{B120°}$, $S_{B240°}$, respectively. Resulting from this are primary position values $\xi_1$ und $\xi_2$ mentioned above. The calculation of position values $\xi_1$ and $\xi_2$ may also include a suitable compensation of interpolation errors. The determination of sensitivity vector $\vec{\alpha}_1$ may be gathered from FIG. 4 for the example described. As required, it is tilted with respect to the X-direction.

Given a wavelength used of, e.g., $\lambda=0.78$ μm and a material-measure grating constant of, e.g., d=2.048 μm, a lateral signal period $SP_X=0.512$ μm and a vertical signal period $SP_Z=1.1$ μm result for this example embodiment.

A position-measuring device according to an exemplary embodiment of the present invention is explained below with reference to FIGS. 5 and 6.

Figure 5:
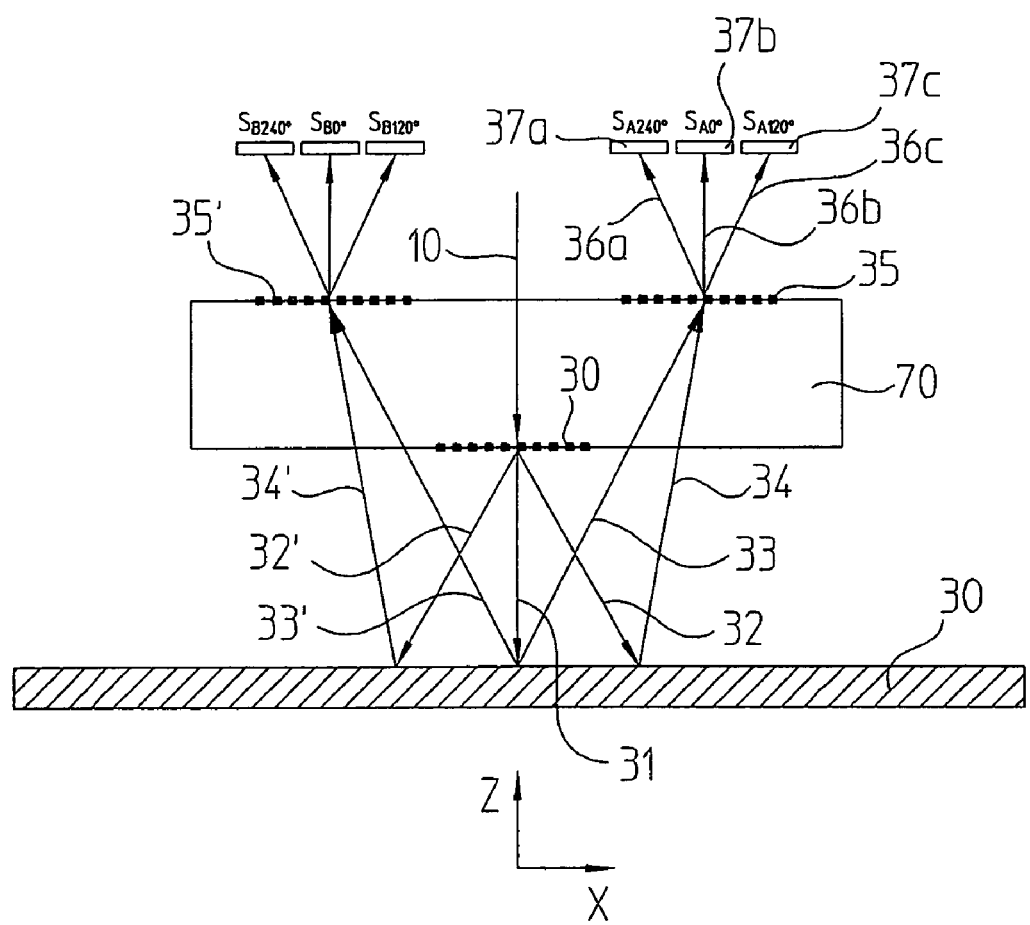
FIG. 5 illustrates a scanning beam path of a position-measuring device according to an example embodiment of the present invention.

In this example embodiment, the three-grating principle of interferential position-measuring devices described, for example, in European Published Patent Application No. 0 163 362, is modified as is illustrated, for example, in the schematic view of FIG. 5.

A first splitting grating 30 on the lower side of a scanning plate 70 splits a collimated light beam 10 of a laser diode into three partial beams of rays 31, 32, 32' (0th, +1st and −1st order of diffraction). Partial beams of rays 32, 31 in the +1st and 0th order of diffraction form two first partial beams of rays for generating the first primary position value. In mirror symmetry thereto, partial beams of rays 31, 32' in the 0th and −1st order of diffraction supply the second partial beams of rays for the second primary position value.

Partial beams of rays 32, 31 in the +1st and 0th order of diffraction are deflected at reflection measuring graduation 30 into −1st and +1st order of diffraction, respectively, so that partial beams of rays 34, 33 propagating in these spatial directions then superimpose on the upper side of scanning plate 70, which has a suitable mixing grating 35 there. Mixing gratings 35 of this type are described, for example, in European Published Patent Application No. 0 163 362, and generate three resulting beams of rays 36*a*, 36*b*, 36*c* with a phase shift of ±120°. These beams of rays 36*a*, 36*b*, 36*c* are converted by photodetectors 37*a*, 37*b*, 37*c* into (current−) signals $S_{A240°}$, $S_{A0°}$, $S_{A120°}$, and evaluated, e.g., in a conventional manner, to form first primary position values $\xi_1$.

Analogous thereto, mirror-symmetric second partial beams of rays 31, 32' supply signals $S_{B0°}$, $S_{B120°}$, $S_{B240°}$ or second primary position value $\xi_2$.

Grating constant $d_{A2}$ of respective second scanning gratings 35, 35' is selected according to the following equation such that, in each case, two partial beams of rays 33, 34 or 33', 34' are guided into identical directions and are able to interfere with each other:

$$\frac{1}{d_{A2}} = \frac{2}{d_M} - \frac{1}{d_{A1}}$$

where $d_{A1}$ represents the grating constant of the first scanning grating, $d_{A2}$ represents the grating constant of the second scanning grating, and $d_M$ represents the grating constant of the measuring graduation.

Figure 6:
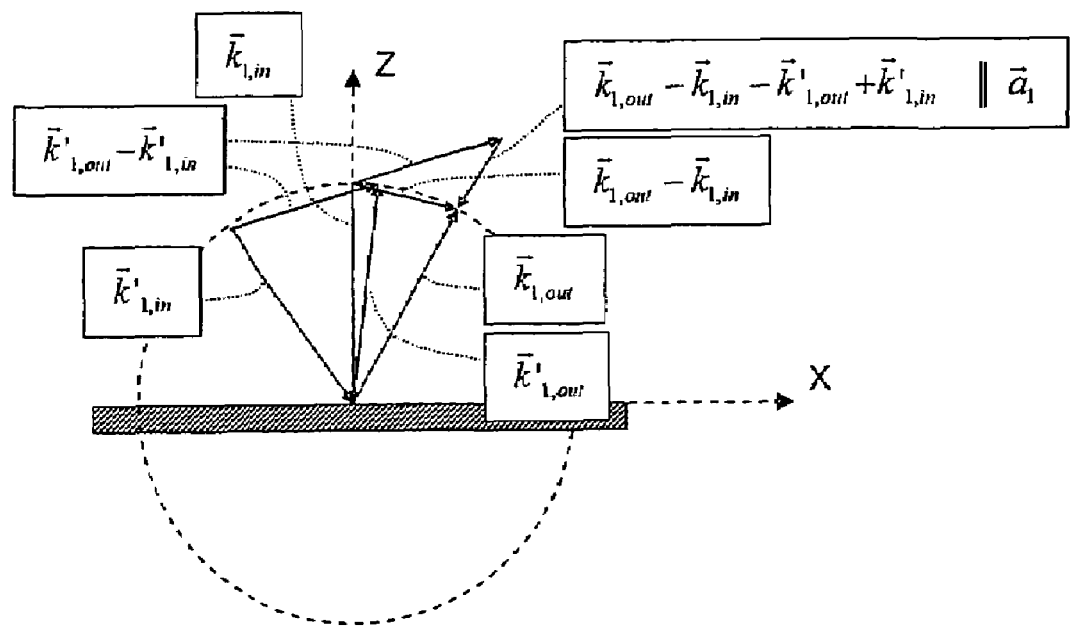
FIG. 6 is a schematic view by which the determination of the sensitivity vector of the example embodiment illustrated in FIG. 5 is clarified.

The sensitivity vector of first primary position value $\xi_1$ is illustrated for this example embodiment in FIG. 6. Due to this arrangement, the corresponding sensitivity vector of the second primary position value is oriented in mirror symmetry thereto.

In the following, several optional refinement possibilities in conjunction with example embodiments of the present invention are described. The various measures may be implemented additionally and/or alternatively.

For example, any asymmetrical scanning beam paths which supply a first primary position value may also be used. In this instance, the beam trajectory may be mirrored, and all participant components for generating the second primary position value are disposed in mirrored fashion.

It is possible to generate phase-shifted signals using, e.g., various conventional methods. Thus, for example, various polarization evaluations may be used, a vernier-strip generation with strip detection using patterned photosensors may be provided, or a direct generation of the phase-shifted signals with scanning gratings may be implemented as described, for example, in European Published Patent Application No. 0 163 362, mentioned above.

The mentioned compensation of the optical path lengths of both interfering partial beams of rays at the nominal distance may be accomplished in a different manner from that described above, as well. Thus, for example, a basically different beam guidance, similar to the first described exemplary embodiment, may be provided. Glass compensation plates may be disposed in the initially shorter partial beam path. Moreover, such a path-length compensation is also possible by polarization-optical components of suitable thickness. In this instance, they may therefore assume a dual function.

Greatly differing variants of light sources may be used as light sources for the position-measuring device. For example, coherent light sources such as stripline laser diodes, VCSEL (Vertical Cavity Surface Emitting Laser) light sources, HeNe lasers, etc., may be provided.

In addition, it is possible to provide different collimation states of the lighting, such as, for example, collimated beams of rays (according to the two example embodiments described above), divergent or convergent beams of rays, etc.

Additionally, it is possible to use a single evaluation electronics for both position-value determinations. In this instance, a parallel position-value determination may be implemented by a double circuit arrangement, or else a serial position-value determination may be performed with buffer storage of signal values in sample and hold elements, for example.

What is claimed is:

1. A position-measuring device for measuring a position of two objects movable relative to one another, comprising:
   a measuring graduation connected to one of the two objects; and
   at least one scanning system adapted to scan the measuring graduation and connected to the other of the two objects, the scanning system adapted to form a first scanning beam path and a second scanning beam path, the scanning system adapted to generate a group of phase-shifted signals from two interfering partial beams of rays in each of the scanning beam paths, the scanning system adapted to permit a simultaneous determination of position values along at least one lateral shift direction of the objects and along a vertical shift direction of the objects from the groups of phase-shifted signals, the two partial beams of rays of each scanning beam path arranged asymmetrically with respect to a plane perpendicular to the lateral shift direction.

2. The position-measuring device according to claim 1, wherein the scanning system is adapted to form a first scanning beam path and a second scanning beam path to determine the position in the lateral shift direction and the vertical shift direction, the scanning system adapted to generate a group of phase-shifted signals from two interfering partial beams of rays in each of the scanning beam paths.

3. The position-measuring device according to claim 2, wherein the second scanning beam path is arranged in mirror symmetry with respect to the first scanning beam path relative to the plane perpendicular to the lateral shift direction, the two partial beams of rays of each scanning beam path diffracted in different orders of diffraction at the measuring graduation.

4. The position-measuring device according to claim 3, further comprising an evaluation device adapted to determine primary position values from interpolated, phase-shifted signals of both groups, a lateral position value and a vertical position value ascertainable from the primary position values.

5. The position-measuring device according to claim 4, further comprising a compensation device adapted to compensate for possible interpolation errors of the primary position values.

6. The position-measuring device according to claim 3, wherein the two partial beams of rays of each scanning beam path are diffracted in one of (a) +1st and (b) −1st order of diffraction at the measuring graduation.

7. The position-measuring device according to claim 3, further comprising means for determining primary position values from interpolated, phase-shifted signals of both groups, a lateral position value and a vertical position value ascertainable from the primary position values.

8. The position-measuring device according to claim 7, further comprising means for compensating for possible interpolation errors of the primary position values.

9. The position-measuring device according to claim 2, further comprising means, arranged in at least one of the scanning beam paths, for providing identical optical path lengths for the interfering partial beams of rays.

10. The position-measuring device according to claim 2, further comprising an optical device arranged in at least one of the scanning beam paths adapted to provide identical optical path lengths for the interfering partial beams of rays.

11. The position-measuring device according to claim 1, wherein the measuring graduation includes a two-dimensional cross grating, the at least one scanning system including three scanning systems arranged in a non-collinear configuration relative to each other and adapted to determine the movement of the objects in six spatial degrees of freedom from linked position values of the three scanning systems.

12. The position-measuring device according to claim 11, wherein the two objects are components of a semiconductor manufacturing device.

13. A position-measuring device for measuring a position of two objects movable relative to one another, comprising:
    a measuring graduation connected to one of the two objects; and
    at least one scanning system adapted to scan the measuring graduation and connected to the other of the two objects, the scanning system adapted to permit a simultaneous determination of position values along at least one lateral shift direction of the objects and along a vertical shift direction of the objects, the scanning system adapted to form a first scanning beam path and a second scanning beam path to determine the position in the lateral shift direction and the vertical shift direction, the scanning system adapted to generate a group of phase-shifted signals from two interfering partial beams of rays in each of the scanning beam paths;
    wherein the two partial beams of rays of each scanning beam path are arranged asymmetrically with respect to a plane perpendicular to the lateral shift direction, the second scanning beam path arranged in mirror symmetry with respect to the first scanning beam path relative to the plane perpendicular to the lateral shift direction, the two partial beams of rays of each scanning beam path diffracted in different orders of diffraction at the measuring graduation.

14. The position-measuring device according to claim 13, further comprising an evaluation device adapted to determine primary position values from interpolated, phase-shifted signals of both groups, a lateral position value and a vertical position value ascertainable from the primary position values.

15. The position-measuring device according to claim 14, further comprising a compensation device adapted to compensate for possible interpolation errors of the primary position values.

16. The position-measuring device according to claim 13, wherein the two partial beams of rays of each scanning beam path are diffracted in one of (a) +1st and (b) −1st order of diffraction at the measuring graduation.

17. The position-measuring device according to claim 13, further comprising means for determining primary position values from interpolated, phase-shifted signals of both groups, a lateral position value and a vertical position value ascertainable from the primary position values.

18. The position-measuring device according to claim 17, further comprising means for compensating for possible interpolation errors of the primary position values.

19. The position-measuring device according to claim 13, further comprising an optical device arranged in at least one of the scanning beam paths adapted to provide identical optical path lengths for the interfering partial beams of rays.

20. The position-measuring device according to claim 13, wherein the measuring graduation includes a two-dimensional cross grating, the at least one scanning system including three scanning systems arranged in a non-collinear configuration relative to each other and adapted to determine the movement of the objects in six spatial degrees of freedom from linked position values of the three scanning systems.

21. The position-measuring device according to claim 20, wherein the two objects are components of a semiconductor manufacturing device.

22. The position-measuring device according to claim 13, further comprising means, arranged in at least one of the scanning beam paths, for providing identical optical path lengths for the interfering partial beams of rays.

23. A position-measuring device for measuring a position of two objects movable relative to one another, comprising:
- a measuring graduation connected to one of the two objects; and
- at least one scanning system adapted to scan the measuring graduation and connected to the other of the two objects, the scanning system adapted to permit a simultaneous determination of position values along at least one lateral shift direction of the objects and along a vertical shift direction of the objects;
- wherein the measuring graduation includes a two-dimensional cross grating, the at least one scanning system including three scanning systems arranged in a non-collinear configuration relative to each other and adapted to determine the movement of the objects in six spatial degrees of freedom from linked position values of the three scanning systems.

24. The position-measuring device according to claim 23, wherein the two objects are components of a semiconductor manufacturing device.

25. The position-measuring device according to claim 23, wherein the scanning system is adapted to form a first scanning beam path and a second scanning beam path to determine the position in the lateral shift direction and the vertical shift direction, the scanning system adapted to generate a group of phase-shifted signals from two interfering partial beams of rays in each of the scanning beam paths.

26. The position-measuring device according to claim 25, wherein the two partial beams of rays of each scanning beam path are arranged asymmetrically with respect to a plane perpendicular to the lateral shift direction, the second scanning beam path arranged in mirror symmetry with respect to the first scanning beam path relative to the plane perpendicular to the lateral shift direction, the two partial beams of rays of each scanning beam path diffracted in different orders of diffraction at the measuring graduation.

27. The position-measuring device according to claim 26, further comprising an evaluation device adapted to determine primary position values from interpolated, phase-shifted signals of both groups, a lateral position value and a vertical position value ascertainable from the primary position values.

28. The position-measuring device according to claim 27, further comprising a compensation device adapted to compensate for possible interpolation errors of the primary position values.

29. The position-measuring device according to claim 25, further comprising an optical device arranged in at least one of the scanning beam paths adapted to provide identical optical path lengths for the interfering partial beams of rays.

30. The position-measuring device according to claim 26, wherein the two partial beams of rays of each scanning beam path are diffracted in one of (a) +1st and (b) −1st order of diffraction at the measuring graduation.

31. The position-measuring device according to claim 23, wherein the two objects are components of a semiconductor manufacturing device.

32. The position-measuring device according to claim 26, further comprising means for determining primary position values from interpolated, phase-shifted signals of both groups, a lateral position value and a vertical position value ascertainable from the primary position values.

33. The position-measuring device according to claim 32, further comprising means for compensating for possible interpolation errors of the primary position values.

34. The position-measuring device according to claim 25, further comprising means, arranged in at least one of the scanning beam paths, for providing identical optical path lengths for the interfering partial beams of rays.

35. A position-measuring device for measuring a position of two objects movable relative to one another, comprising:
- a measuring graduation connected to one of the two objects;
- at least one scanning system adapted to scan the measuring graduation and connected to the other of the two objects, the scanning system adapted to permit a simultaneous determination of position values along at least one lateral shift direction of the objects and along a vertical shift direction of the objects, the scanning system adapted to form a first scanning beam path and a second scanning beam path to determine the position in the lateral shift direction and the vertical shift direction, the scanning system adapted to generate a group of phase-shifted signals from two interfering partial beams of rays in each of the scanning beam paths; and
- means, arranged in at least one of the scanning beam paths, for providing identical optical path lengths for the interfering partial beams of rays.

* * * * *